(12) United States Patent
Park (10) Patent No.: US 11,169,521 B2
(45) Date of Patent: Nov. 9, 2021

(54) SAFETY CONTROL SYSTEM AND METHOD FOR AUTONOMOUS VEHICLE

(71) Applicant: Mando Corporation, Pyeongtaek-si (KR)

(72) Inventor: Min Woo Park, Seongnam-si (KR)

(73) Assignee: Mando Corporation, Pyeongtaek-si (KR)

(*) Notice: Subject to any disclaimer, the term of this patent is extended or adjusted under 35 U.S.C. 154(b) by 0 days.

(21) Appl. No.: 16/719,542

(22) Filed: Dec. 18, 2019

(65) Prior Publication Data
US 2020/0201323 A1  Jun. 25, 2020

(30) Foreign Application Priority Data

Dec. 19, 2018 (KR) .................. 10-2018-0165280

(51) Int. Cl.
*G05D 1/00* (2006.01)
*G06K 9/00* (2006.01)
(Continued)

(52) U.S. Cl.
CPC ....... *G05D 1/0072* (2013.01); *B60W 50/0205* (2013.01); *B60W 50/045* (2013.01);
(Continued)

(58) Field of Classification Search
CPC ......... G05D 1/0072; G05D 2201/0213; G05D 1/0061; G05D 1/0212; G05D 1/0088;
(Continued)

(56) References Cited

U.S. PATENT DOCUMENTS 9,195,232 B1 * 11/2015 Egnor .................. B60W 10/20
9,616,896 B1 *  4/2017 Letwin ............... B60W 50/082
(Continued)

FOREIGN PATENT DOCUMENTS

JP     H11-066494 A    3/1999
JP    2013-230812 A   11/2013
(Continued)

OTHER PUBLICATIONS

Office Action issued in corresponding Korean Patent Application No. 10-2020-0171150, dated Aug. 6, 2021 with English Translation.
(Continued)

*Primary Examiner* — Muhammad Shafi
(74) *Attorney, Agent, or Firm* — Morgan, Lewis & Bockius LLP (57) ABSTRACT

Provided are a safety control system and method for an autonomous vehicle. The safety control system includes a sensor installed in a vehicle and including at least a camera and a light detection and ranging (LiDAR), a main domain control unit (DCU) configured to control autonomous driving from an origin to a destination on the basis of various kinds of information transferred through communication with the sensor, and a redundancy DCU configured to ensure safety of the vehicle by performing a safety function when an event occurs in the autonomous driving due to a fault of the main DCU. According to this configuration, the main DCU and the redundancy DCU are provided, and thus it is possible to simultaneously ensure a fully autonomous driving function and a system safety control function.

19 Claims, 5 Drawing Sheets

(51) Int. Cl.
*B60W 50/04* (2006.01)
*B60W 50/02* (2012.01)
*B60W 50/029* (2012.01)

(52) U.S. Cl.
CPC ....... *G05D 1/0061* (2013.01); *G06K 9/00798* (2013.01); *G06K 9/00805* (2013.01); *B60W 2050/022* (2013.01); *B60W 2050/0295* (2013.01)

(58) Field of Classification Search
CPC .......... G06K 9/00805; G06K 9/00798; B60W 50/045; B60W 50/0205; B60W 2050/022; B60W 2050/0295; B60W 2050/0292; B60W 50/04; B60W 60/0015; B60W 2420/52; B60W 2420/42; B60W 50/02; B60W 30/14; B60W 40/02; B60W 30/181; B60W 2554/00; B60R 21/0134; B60Q 1/52; B60Y 2300/18091
USPC ....................................................... 701/29.2
See application file for complete search history.

(56) References Cited

U.S. PATENT DOCUMENTS

| | | | |
|---|---|---|---|
| 2018/0259966 A1* | 9/2018 | Long | G05D 1/0246 |
| 2019/0019409 A1* | 1/2019 | Farr | G08G 1/0965 |
| 2019/0064805 A1* | 2/2019 | Frazzoli | G05D 1/0061 |
| 2019/0106117 A1* | 4/2019 | Goldberg | G06F 11/00 |
| 2020/0017116 A1* | 1/2020 | Jales Costa | B60W 50/0205 |
| 2020/0062199 A1* | 2/2020 | Kwon | H02J 9/061 |

FOREIGN PATENT DOCUMENTS

| | | |
|---|---|---|
| JP | 2017-523074 A | 8/2017 |
| JP | 2017-157067 A | 9/2017 |
| JP | WO2018/154861 A | 8/2018 |
| KR | 10-2018-0031586 A | 3/2018 |
| KR | 10-2018-0082886 A | 7/2018 |

OTHER PUBLICATIONS

Office Action issued in corresponding Korean Patent Application No. 10-2020-0171150, dated Aug. 6, 2021.

* cited by examiner

SAFETY CONTROL SYSTEM AND METHOD FOR AUTONOMOUS VEHICLE

CROSS-REFERENCE TO RELATED APPLICATION

This application claims priority to and the benefit of Korean Patent Application No. 2018-165280, filed on Dec. 19, 2018, the disclosure of which is incorporated herein by reference in its entirety.

BACKGROUND

1. Field of the Invention

The present disclosure relates to a safety control system and method for an autonomous vehicle and a computer-readable storage medium and more particularly, to a safety control system which activates an auxiliary domain control unit (DCU) and brings a vehicle to a safe stop with or without the driver's intervention when an event, such as a fault, occurs in a main DCU of an autonomous driving system.

2. Discussion of Related Art

In general, an autonomous driving system selects an optimal travel route and autonomously drives a vehicle using a lane departure prevention technology, a lane change control technology, an obstacle avoidance technology, etc., denoting a technology related to driving of a vehicle autonomously moving to a destination even when the driver does not manipulate the steering wheel, the accelerator pedal, the brake, and the like.

The autonomous driving technology requires various key technologies in order to be implemented. For example, the autonomous driving technology requires a highway driving assist (HDA) technology for automatically maintaining an inter-vehicle distance, a lane departure warning system (LDWS), a lane keeping assist system (LKAS), a blind spot detection (BSD) system, an advanced smart cruise control (ASCC) system, an automatic emergency brake (AEB) system, and the like.

With the high-level autonomous driving technology applied to vehicles in earnest, various electric control units (ECUs) taking charge of calculation and control commands for autonomous driving are installed and connected to a vehicular network.

These ECUs communicate through the vehicular network and exchange necessary signals. In particular, the fault of an ECU taking charge of the core functions of autonomous driving paralyzes entire system functions and directly leads to an accident.

Technologies are being introduced to replace functions of an ECU even when the ECU malfunctions during travel.

As an example, there is a technology for performing a safety function by using only one ECU of an autonomous vehicle. However, since signal processing modules are doubled in one ECU, it is difficult to handle hardware problems, such as ECU power and communication, with this technology.

As another example, there is a technology for applying two master ECUs in preparation for hardware problems. Even in this case, however, there is a problem of packaging in a vehicle, and it is very disadvantageous in terms of system cost.

Consequently, it is necessary to provide an autonomous driving system which uses not only a master ECU generally taking charge of fully autonomous driving but also a slave ECU taking charge of a safety function when the master ECU malfunctions.

For example, a slave ECU which is asymmetric to a general master ECU is provided, and two ECUs including a master ECU and a slave ECU having different configurations and functions are used. In this case, the slave ECU may perform various safety functions.

RELATED ART DOCUMENTS (Patent literature 1) Korean Unexamined Patent Publication No. 10-2018-0082886

SUMMARY OF THE INVENTION

The present invention is directed to providing a safety control system of an autonomous vehicle which supports an auxiliary safety control function even when an event, such as a fault, occurs in a domain control unit (DCU) supporting fully autonomous driving functions from an origin to a destination.

For example, the present invention provides a safety control system of an autonomous vehicle in which a redundancy DCU is separately provided in addition to a main DCU and independently performs a safety control function in systematic combination with the main DCU.

The present invention is also directed to providing a safety control system of an autonomous vehicle which may perform a safety control function even when a fault occurs in an actuator as well as a DCU.

According to an aspect of the present invention, there is provided a safety control system for an autonomous vehicle, the safety control system including: a sensor installed in a vehicle and including at least a camera and a light detection and ranging (LiDAR); a main DCU configured to control autonomous driving from an origin to a destination on the basis of various kinds of information transferred through communication with the sensor; and a redundancy DCU configured to ensure safety of the vehicle by performing a safety function when an event occurs in the autonomous driving due to a fault of the main DCU.

According to another aspect of the present invention, there is provided a safety control method for an autonomous vehicle, the safety control method including: setting a destination and starting autonomous driving from an origin; self-diagnosing, by a main DCU, an autonomous vehicle and transmitting inner monitoring information to a redundancy DCU in real time; checking, by the redundancy DCU, whether there is a fault in the main DCU on the basis of the self-diagnosis and the inner monitoring information; when a fault is detected in the main DCU and it is determined that an event has occurred in the autonomous driving, activating, by the redundancy DCU, a safety control function; and stopping the vehicle at a safe location for safety of the vehicle and finishing the autonomous driving.

According to another aspect of the present invention, there is provided a computer-readable storage medium in which a safety control computer program for an autonomous vehicle is stored, the computer program being executed by a main DCU or a redundancy DCU to implement one or more operations. The one or more operations include: setting a destination and starting autonomous driving from an origin; self-diagnosing, by the main DCU, an autonomous vehicle and transmitting inner monitoring information to the redundancy DCU in real time; checking, by the redundancy DCU, whether there is a fault in the main DCU on the basis of the self-diagnosis and the inner monitoring information; when a fault is detected in the main DCU and it is determined that an event has occurred in the autonomous driving, activating, by the redundancy DCU, a safety control function; and stopping the vehicle at a safe location for safety of the vehicle and finishing the autonomous driving.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for achieving them will be made clear from embodiments described below in detail with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined only by the claims. In the drawings, the sizes and relative sizes of layers and regions may be exaggerated for clarity. Throughout the specification, like elements denote like elements.

Exemplary embodiments set forth herein will be described with reference to plan views and cross-sectional views, which are ideal schematics of the present invention. Therefore, the shapes of illustrations may be modified by manufacturing techniques, tolerances, and/or the like. Accordingly, the embodiments of the present invention are not limited to the specific forms shown but also include changes in the forms generated according to a manufacturing process. Consequently, regions illustrated in the drawings have schematic attributes, and the shapes of the regions illustrated in the drawings are intended to illustrate specific types of regions of elements and are not intended to limit the scope of the invention.

To implement an autonomous driving system, in an autonomous vehicle, a highway driving assist (HDA) system for automatically maintaining an inter-vehicle distance, a blind spot detection (BSD) system for sensing a nearby vehicle and raising an alarm while the vehicle is moving backward, an automatic emergency brake (AEB) system for operating a brake system when a preceding vehicle is recognized, a lane departure warning system (LDWS), a lane keeping assist system (LKAS) for complementing a deviation from a lane without turning on a turn signal, an advanced smart cruise control (ASCC) system for maintaining an inter-vehicle distance and traveling at a set constant velocity, a traffic jam assist (TJA) system, etc. should operate normally.

In such an autonomous vehicle, a safety function should be ensured by a system without the driver's intervention when some parts or modules of the aforementioned systems malfunction and cannot operate normally.

To this end, an actuator of an autonomous driving system, such as a steering or brake system, generally employs a redundancy structure. Such a redundancy structure has a symmetric form in which parts are doubled or an asymmetric form in which control is maintained through an auxiliary path when a malfunction occurs. As for sensors, many different types of sensors, such as a camera, a light detection and ranging (LiDAR), and a radar, are used, and the sensing areas thereof are configured to overlap, so that sensing redundancy may be ensured. In particular, it is necessary to ensure redundancy of an autonomous driving domain control unit (DCU) on which autonomous driving software is installed. In the present invention, such an autonomous driving DCU may include a master DCU which performs all the functions of autonomous driving and a slave DCU in an asymmetric structure.

Accordingly, the redundancy DCU, which takes charge of a safety function when the main DCU malfunctions, auxiliarily operates in addition to the main DCU which generally takes charge of fully autonomous driving. However, the redundancy DCU has a different configuration and function from the main DCU and thus may be installed independently of the main DCU to perform a safety function. Consequently, an actuator, such as the steering or brake system, is under the control of the main DCU during normal operation but may be brought under the control of the redundancy DCU when a fault occurs.

As described above, the present invention relates to an autonomous driving system which senses lanes and the like using various sensors for sensing lanes and/or objects on the road and processes autonomous driving software (recognition, locating, determining, and control) through the main DCU on the basis of information on the lanes and the like. Also, the present invention relates to an autonomous driving system in which the redundancy DCU separately taking charge of a safety function auxiliarily operates.

Hereinafter, a safety control system for an autonomous vehicle having the above-described configuration according to an exemplary embodiment of the present invention will be described in detail with reference to the accompanying drawings.

Figure 1:
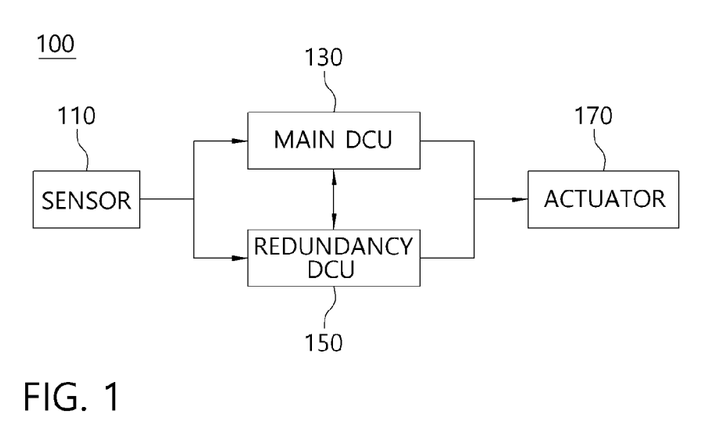
FIG. 1 is a block diagram showing a configuration of a safety control system according to an exemplary embodiment of the present invention.
Figure 2:
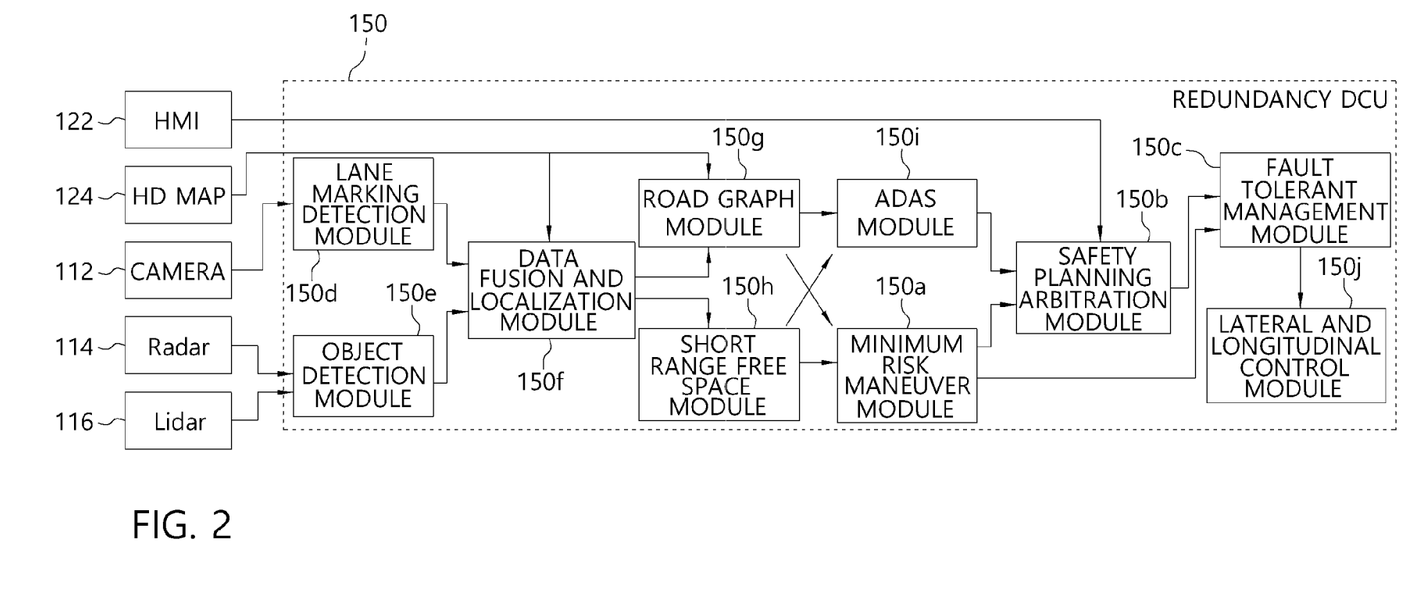
FIG. 2 is a block diagram showing a configuration of a redundancy domain control unit (DCU) according to an exemplary embodiment of the present invention.

Referring to FIGS. 1 and 2, to this end, a safety control system 100 for an autonomous vehicle according to an exemplary embodiment of the present invention includes a sensor 110 including at least a camera 112, a radar 114, and a LiDAR 116, a main DCU 130 taking charge of fully autonomous driving from an origin to a destination on the basis of various kinds of information transferred from the sensor 110 through controller area network (CAN) communication or an Ethernet, a redundancy DCU 150 ensuring safety of the autonomous vehicle by performing a safety function when a fault occurs in the main DCU 130 and the driver cannot immediately handle the fault, and an actuator 170 operating under the control of the main DCU 130 or the redundancy DCU 150.

The camera 112 may be any of a mono camera, a stereo camera, a 360-degree camera, etc. as long as the camera may be installed in the vehicle, acquire an external image of the vehicle, and particularly acquire location information or distance information of lanes or objects.

The radar 114 may be any of a pulse radar or a continuous wave radar as long as the radar includes a transmitter and a receiver and may detect nearby objects and detect the location, distance, or relative velocity of a detected object.

The LiDAR 116 may be any of a mobile type and an immobile type as long as the LiDAR includes a laser transmitter and receiver and may detect objects near the vehicle.

For direct control of the driver, the vehicle may ask the driver whether to drive in person in an emergency situation. A human machine interface (HMI) 122 may be further included for the driver to select an action. When the driver presses a take-over button, which will be described below, in response to the question of the HMI 122, it is considered that the driver drives the vehicle by his or her selection and will.

The vehicle may further include a map 124. When it is difficult to implement fully autonomous driving through the above-described sensor 110 and particularly it is not possible to use the above-described sensor 110 due to the weather or road condition, the vehicle may be brought to a safe stop by using the map 124 in systematic combination with map information. The map 124 may be varied depending on precision. In particular, a high definition (HD) map has a margin of error of tens of centimeters or less and thus is useful for changing lanes and moving the vehicle to a safe zone or a shoulder safely and accurately.

The objects may include a vehicle, a pedestrian, and the like.

The main DCU 130 performs all the autonomous driving functions from an origin to a destination.

The redundancy DCU 150 may change a destination and perform a safe stop function in an emergency situation or when an event occurs during autonomous driving. The redundancy DCU 150 provides various safe stop functions as follows.

For a safe function, the redundancy DCU 150 may include a minimum risk maneuver module 150a which autonomously moves the vehicle to a nearby safe location and brings the vehicle to a safe stop when it is determined that an event threatening safe driving has occurred in the vehicle.

To safely stop the vehicle, the map 124 is searched for a closest safe zone, and when there is a safe zone, the vehicle is autonomously moved and stopped in the safe zone. In general, a place that a vehicle is not allowed to enter is provided on the road. When there is a safe zone for evacuation near the vehicle, the minimum risk maneuver module 150a performs a function of evacuating the vehicle to a safe zone in which a stop is allowed only in an emergency situation.

When there is no safe zone for evacuation near the vehicle but there is a shoulder that a vehicle is allowed to pass only in an emergency situation, the minimum risk maneuver module 150a may safely move the vehicle to the shoulder that most vehicles do not pass.

When it is difficult for the vehicle to autonomously move to a shoulder or it is an urgent situation, such as a fender-bender, the minimum risk maneuver module 150a performs a function of gradually reducing the velocity with emergency lights on and stopping in a lane in which the vehicle is travelling.

For a safe function, the redundancy DCU 150 may include a safety planning arbitration module 150b which provides minimum advanced driver assistance system (ADAS) functions when the driver wants to drive in person so as to move the vehicle.

When a take-over request is received from the driver, the vehicle stops the function of the minimum risk maneuver module 150a and supports the minimum ADAS functions to move under the direct control of the driver. For example, when the driver presses the take-over button during a minimum risk maneuver, the safety planning arbitration module 150b operates, and the vehicle may make a safe travel under the driver's decision with the support of ADAS functions. In other words, the vehicle may be brought to a safe stop according to the driver's decision on an action.

For a safety function, the redundancy DCU 150 may include a fault tolerant management module 150c which performs, when a fault occurs in an actuator, a safety function with respect to the faulty actuator.

When faults occur in the actuator 170 as well as the main DCU 130, the faults may not be handled by the above-described minimum risk maneuver module 150a or the safety planning arbitration module 150b. Consequently, some of other functions of the actuator 170 may be used to implement a safe travel.

For example, when the brake system malfunctions, braking force of the vehicle may be provided through the steering system or the powertrain system. Also, when the steering system malfunctions, minimum steering force may be provided through the brake system. Also, the velocity of the vehicle may be reduced step by step through an engine brake. Meanwhile, an electric motor is a power generator. Therefore, when the brake of an electric vehicle does not operate normally, the velocity of the vehicle may be reduced by using heat generated by power generation.

A general brake system or steering system may have an auxiliary function of preparing for a fault, but the above-described fault tolerant management function operates when the auxiliary function is not provided or the provided auxiliary function is not performed normally.

In addition, the safety control system 100 according to an exemplary embodiment of the present invention may include the following modules for safe driving. In other words, the redundancy DCU 150 may include the following modules for ensuring several safety control functions, some of which overlap the autonomous driving functions of the main DCU 130, to safely handle an accident.

The redundancy DCU 150 may further include one or more of a lane marking detection module 150d for sensing a lane on the road, an object detection module 150e for sensing an object on the road (e.g., another vehicle, a pedestrian, etc.), a data fusion and localization module 150f for sensing the relative locations of the lane and the object with respect to the subject vehicle, a road graph module 150g for finding the absolute locations of the subject vehicle, the lane, and the object on an HD map, and a short range free space module 150h for determining a drivable area on the basis of the sensed object.

The lane marking detection module 150d may detect lanes in an image captured by the camera 112 or the like and find a safe zone or a shoulder on the basis of the lane detection results.

The object detection module 150e may sense other vehicles on the road so that the subject vehicle may move to a safe zone or stop on the road without colliding with another vehicle when a fault occurs.

The data fusion and localization module 150*f* may accurately calculate the location of the vehicle through complex operation of the sensor 110 installed in the vehicle, and the road graph module 150*g* corrects the location of the subject vehicle using the map 124, which is an HD map for supporting autonomous driving, and thereby improve precision.

The short range free space module 150*h* detects nearby objects through the camera 112 or the short range radar 114, determines a drivable area, and rapidly guides the vehicle to a safe zone.

The redundancy DCU 150 may further include an ADAS module 150*i* for supporting the aforementioned ADAS functions or a lateral and longitudinal control module 150*j* for maintaining and optimizing the lateral and longitudinal path of the vehicle even in the case of an unexpected fault of an actuator or the like.

A safety control method for an autonomous vehicle according to an exemplary embodiment of the present invention will be described below.

Figure 3:
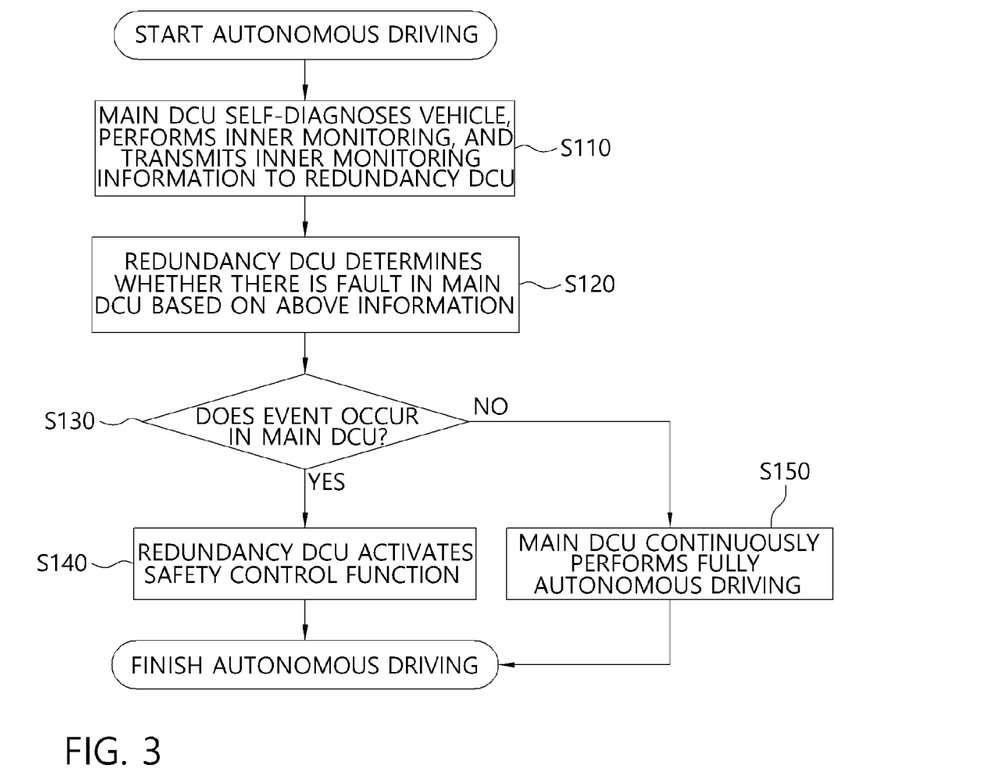
FIG. 3 is a flowchart illustrating an autonomous driving method according to an exemplary embodiment of the present invention.

Referring to FIG. 3, a destination is set, and autonomous driving is started from an origin.

The main DCU 130 self-diagnoses the autonomous vehicle and transmits inner monitoring information to the redundancy DCU 150 in real time (S110).

The redundancy DCU 150 checks whether there is a fault in the main DCU 130 on the basis of the self-diagnosis and the inner monitoring information (S120).

When a fault is detected in the main DCU 130 and it is determined that an event has occurred in the autonomous driving (S130), the redundancy DCU activates a safety control function (S140). When any event does not occur, fully autonomous driving is continuously performed (S150).

When the vehicle is stopped at a safe location for the vehicle's safety after an event occurs in the autonomous driving or the vehicle arrives at the destination without any event in the autonomous driving, the autonomous driving is finished.

Figure 4:
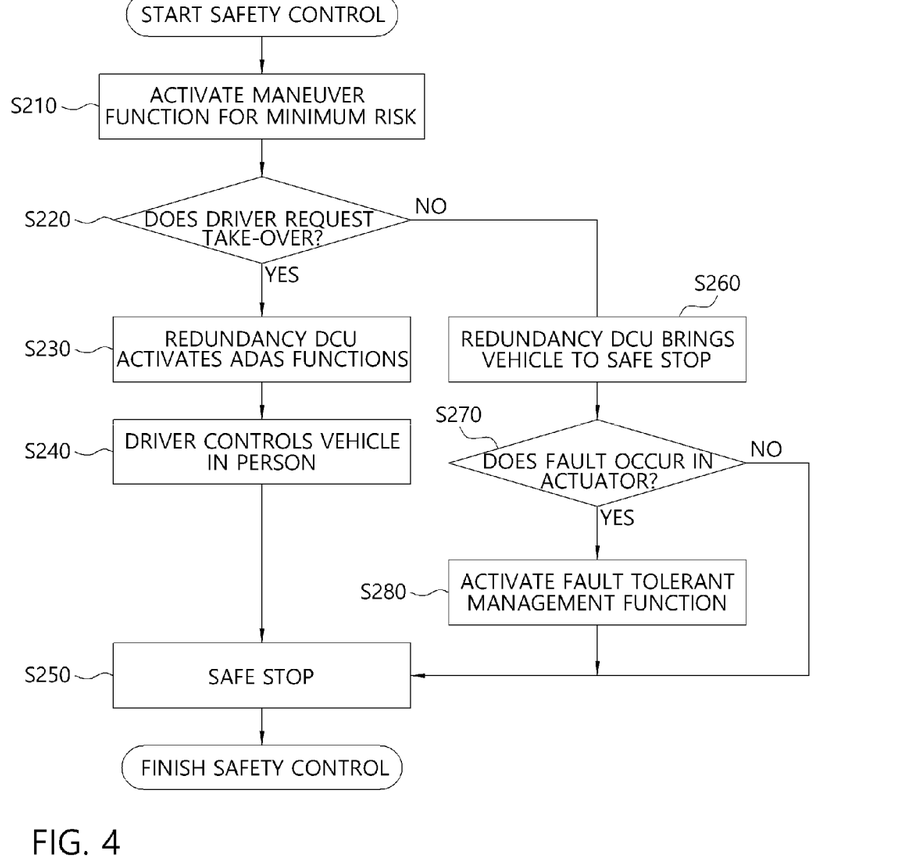
FIG. 4 is a flowchart illustrating a safety control method according to an exemplary embodiment of the present invention.

Referring to FIG. 4, when the safety control function is activated (see S140 in FIG. 3), safety control is started to prevent an accident and ensure safety of the vehicle.

When an event occurs, a maneuver function for safe driving with minimum risk is activated to minimize the risk of collision with objects (S210).

Even while the minimum risk maneuver module 150*a* operates, the driver may take over driving from the autonomous driving by manipulating the take-over button if he or she does not want a safe stop to be fully made by the safety control system 100. When there is a take-over request of the driver (S220), the redundancy DCU 150 activates the minimum ADAS functions (S230), and the driver controls the vehicle in person (S240), so that the vehicle may be stopped at a desired location (S250).

When there is no take-over request of the driver, the redundancy DCU 150 brings the vehicle to a safe stop (S260).

In this case, it is determined whether a fault also occurs in the actuator 170 with the fault occurring in the main DCU 130 (S270). When the brake system, the steering system, the powertrain system, or the like does not operate normally, the fault tolerant management function is activated (S280).

In this way, the driver takes over and controls the vehicle in person, or the system changes the destination and brings the vehicle to a safe stop, so that the safety control is finished.

Figure 5:
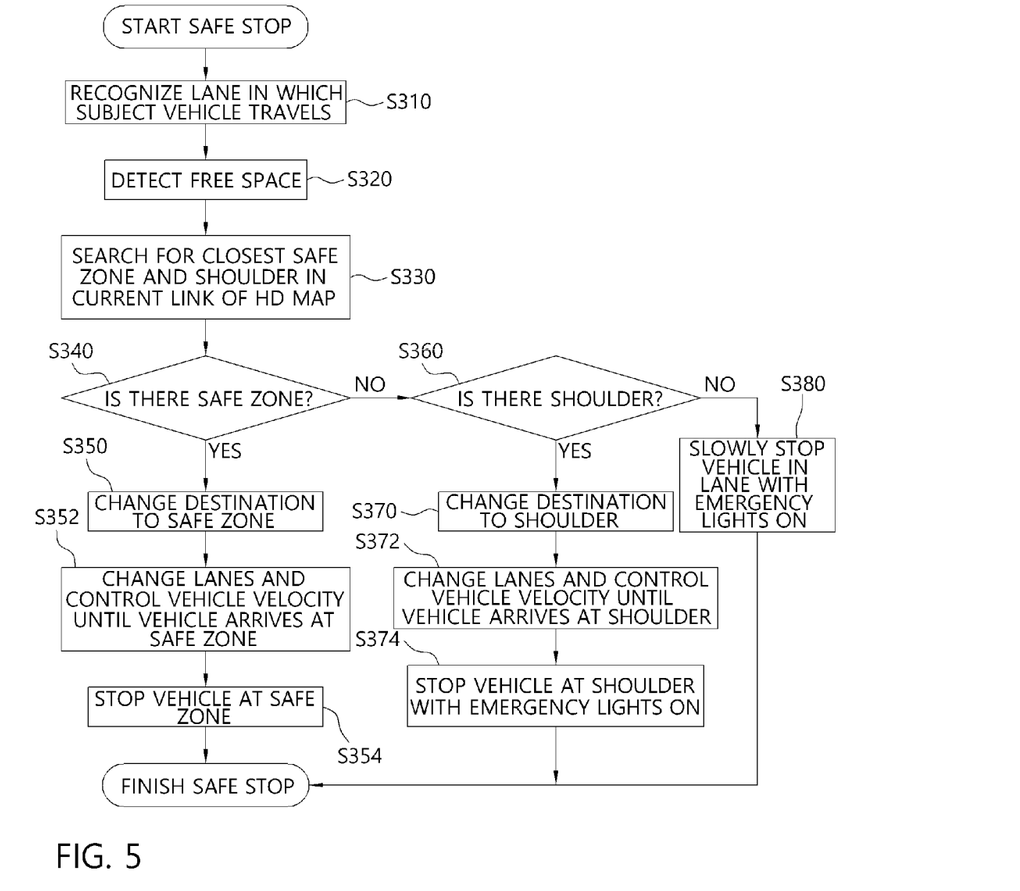
FIG. 5 is a flowchart illustrating a safe stop method according to an exemplary embodiment of the present invention.

Referring to FIG. 5, a safe stop is started in preparation for an accident.

The lane marking detection module 150*d* detects a lane in which the subject vehicle travels, and the object detection module 150*e* senses nearby objects (S310). The short range free space module 150*h* searches for a nearby drivable area (S320). Also, the data fusion and localization module 150*f* and the road graph module 150*g* find the relative location and the absolute location of the subject vehicle and search for a nearby safe zone and shoulder with the support of the map 124, thereby rapidly preparing for a safe stop (S330).

First, it is determined whether there is a safe zone nearby (S340).

When a safe zone is in the current link of an HD map, the destination is changed to the safe zone (S350). Until the vehicle arrives at the safe zone, lanes are changed, and the vehicle velocity is controlled (S352). When the vehicle arrives at the safe zone, the vehicle is safely stopped (S354).

When there is no safe zone nearby, it is determined whether there is a shoulder nearby (S360).

When a shoulder is in the current link of the HD map, the destination is changed to the shoulder (S370). Until the vehicle arrives at the shoulder, lanes are changed, and the vehicle velocity is controlled (S372). When the vehicle arrives at the shoulder, the vehicle is safely stopped with emergency lights on (S374).

When there is no nearby shoulder in the current link of the HD map, the vehicle is slowly brought to a safe stop in a lane with emergency lights on (S380).

As described above, according to the present invention, it is possible to expect the following effects.

First, when a minimum risk maneuver algorithm is used, it is possible to sense a lane in which a subject vehicle travels and a drivable area, find a closest safe zone on a map, autonomously move to the closest safe zone, and safely stop. When there is no safe zone, it is possible to find a shoulder, autonomously move to the shoulder, and safely stop. Even when there is no shoulder, a manual for stopping on the road with emergency lights on is provided, and thus the convenience of a user preparing for a vehicle accident is improved.

Second, when a safety plan arbitration algorithm is used, a driver can control a vehicle in person by selecting takeover, and even in this case, minimum ADAS functions are supported. Consequently, it is possible to obtain the merits of both in-person driving and autonomous driving.

Third, a fault may occur in an actuator as well as a control tower, and the actuator may not have a redundancy function. Even in this case, when a fault tolerant management algorithm is used, another actuator can replace functions of the actuator. Consequently, in an emergency situation in which a brake or a steering system cannot operate unexpectedly, it is possible to make a safe stop so that accidents can be effectively prevented.

As described above, the technical spirit of the present invention relates to a safety control system in which when an event occurs in autonomous driving due to a fault of a main DCU in an autonomous driving system, a redundancy DCU is activated to support safe driving and a safe stop with or without the driver's intervention. Those of ordinary skill in the art should appreciate that the present invention can be variously modified or altered without departing from the technical spirit of the present invention.

What is claimed is:

1. A safety control system for an autonomous vehicle, the safety control system comprising:
a sensor installed in the autonomous vehicle and including at least one of a camera or a light detection and ranging (LiDAR);
a main domain control unit (DCU) configured to control autonomous driving from an origin to a destination on the basis of various kinds of information transferred through communication with the sensor; and
a redundancy DCU configured to:
ensure safety of the autonomous vehicle by performing a safety function when an event occurs in the autonomous driving due to a fault of the main DCU,
determine whether there exists a safe zone or a shoulder near the autonomous vehicle,
when it is determined that the safe zone exists near the autonomous vehicle, change the destination to the safe zone,
when it is determined that no safe zone exists and the shoulder exists near the autonomous vehicle, change the destination to the shoulder, and
when it is determined that the safe zone and the shoulder near the autonomous vehicle do not exist, slowly bring the autonomous vehicle to a safe stop in a lane with emergency lights on.

2. The safety control system of claim 1, wherein the redundancy DCU comprises a minimum risk maneuver module configured to autonomously move the autonomous vehicle to a nearby safe location and bring the autonomous vehicle to the safe stop when the event occurs and it is determined that it is impossible for a driver to immediately handle the event.

3. The safety control system of claim 2, wherein the redundancy DCU to perform the following processing:
sense a lane or an object on a road;
sense relative locations of the lane or the object concerning the autonomous vehicle;
recognize the relative locations to absolute locations of the lane or the object on a high definition (HD) map; and
determine a drivable area based on the sensed object.

4. The safety control system of claim 1, wherein the redundancy DCU comprises a safety planning arbitration module configured to provide minimum advanced driver assistance system (ADAS) functions when a driver wants to drive in person in order to move the autonomous vehicle.

5. The safety control system of claim 4, wherein the redundancy DCU to perform the following processing:
sense a lane or an object on a road;
sense relative locations of the lane or the object concerning the autonomous vehicle;
recognize the relative locations to absolute locations of the lane or the object on a high definition (HD) map; and
determine a drivable area based on the sensed object.

6. The safety control system of claim 1, wherein the redundancy DCU comprises a fault tolerant management module configured to perform a safety function with respect to an actuator of the autonomous vehicle when a fault occurs in the actuator.

7. The safety control system of claim 6, wherein the redundancy DCU to perform the following processing:
sense a lane or an object on a road;
sense relative locations of the lane or the object concerning the autonomous vehicle;
recognize the relative locations to absolute locations of the lane or the object on a high definition (HD) map; and
determine a drivable area based on the sensed object.

8. The safety control system of claim 1, wherein the redundancy DCU to perform the following processing:
sense a lane or an object on a road;
sense relative locations of the lane or the object concerning the autonomous vehicle;
recognize the relative locations to absolute locations of the lane or the object on a high definition (HD) map; and
determine a drivable area based on the sensed object.

9. The safety control system of claim 1, further comprising an actuator configured to safely operate according to control of the main DCU or the redundancy DCU.

10. The safety control system of claim 9, wherein the redundancy DCU comprises a minimum risk maneuver module configured to autonomously move the autonomous vehicle to a nearby safe location and bring the autonomous vehicle to the safe stop when the event occurs and it is determined that it is impossible for a driver to immediately handle the event.

11. The safety control system of claim 10, wherein the redundancy DCU to perform the following processing:
sense a lane or an object on a road;
sense relative locations of the lane or the object concerning the autonomous vehicle;
recognize the relative locations to absolute locations of the lane or the object on a high definition (HD) map; and
determine a drivable area based on the sensed object.

12. The safety control system of claim 9, wherein the redundancy DCU comprises a safety planning arbitration module configured to provide minimum advanced driver assistance system (ADAS) functions when a driver wants to drive in person in order to move the autonomous vehicle.

13. The safety control system of claim 12, wherein the redundancy DCU to perform the following processing:
sense a lane or an object on a road;
sense relative locations of the lane or the object concerning the autonomous vehicle;
recognize the relative locations to absolute locations of the lane or the object on a high definition (HD) map; and
determine a drivable area based on the sensed object.

14. The safety control system of claim 9, wherein the redundancy DCU comprises a fault tolerant management module configured to perform a safety function with respect to the actuator of the autonomous vehicle when a fault occurs in the actuator.

15. The safety control system of claim 14, wherein the redundancy DCU to perform the following processing:
sense a lane or an object on a road;
sense relative locations of the lane or the object concerning the autonomous vehicle;
recognize the relative locations to absolute locations of the lane or the object on a high definition (HD) map; and
determine a drivable area based on the sensed object.

16. A safety control method for an autonomous vehicle, the safety control method comprising:
setting a destination and starting autonomous driving from an origin;
self-diagnosing, by a main domain control unit (DCU), the autonomous vehicle and transmitting inner monitoring information to a redundancy DCU in real time;

checking, by the redundancy DCU, whether there is a fault in the main DCU on the basis of the self-diagnosis and the inner monitoring information;

when a fault is detected in the main DCU and it is determined that an event has occurred in the autonomous driving, activating, by the redundancy DCU, a safety control function; and stopping the autonomous vehicle at a safe location for safety of the autonomous vehicle and finishing the autonomous driving, wherein the stopping of the autonomous vehicle at the safe location comprises:
  searching for a safe zone or a shoulder near the autonomous vehicle with support of a high definition (HD) map and rapidly preparing for a safe stop;
  upon determining that there is a safe zone near the autonomous vehicle, changing the destination to the safe zone, and when the autonomous vehicle arrives at the safe zone, bringing the autonomous vehicle to the safe stop;
  upon determining that there is no safe zone but there is a shoulder near the autonomous vehicle, changing the destination to the shoulder, and when the autonomous vehicle arrives at the shoulder, bringing the autonomous vehicle to the safe stop; and
  upon determining that there is neither safe zone nor shoulder near the autonomous vehicle, slowly bringing the autonomous vehicle to the safe stop in a lane with emergency lights on.

17. The safety control method of claim 16, wherein the activating of the safety control function comprises:
  when an event occurs in the autonomous driving, activating maneuver functions for safe driving with minimum risk;
  receiving a take-over request of a driver among the maneuver functions for safe driving with minimum risk; and
  enabling, by the redundancy DCU, the driver to control the autonomous vehicle in person, and stopping, by the driver, the autonomous vehicle at a safe location with support of minimum advanced driver assistance system (ADAS) functions.

18. The safety control method of claim 17, wherein the activating of the safety control function further comprises activating a fault tolerant management function when a take-over request of the driver is not received and a fault occurs in an actuator with the fault occurring in the main DCU.

19. A non-transitory computer-readable storage medium in which a computer program is stored, the computer program being executed by a main domain control unit (DCU) or a redundancy DCU to implement one or more operations, wherein the one or more operations comprise:
  setting a destination and starting autonomous driving from an origin;
  self-diagnosing, by the main DCU, an autonomous vehicle and transmitting inner monitoring information to the redundancy DCU in real time;
  checking, by the redundancy DCU, whether there is a fault in the main DCU on the basis of the self-diagnosis and the inner monitoring information;
  when a fault is detected in the main DCU and it is determined that an event has occurred in the autonomous driving, activating, by the redundancy DCU, a safety control function; and
  stopping the autonomous vehicle at a safe location for safety of the autonomous vehicle and finishing the autonomous driving,
  wherein the stopping of the autonomous vehicle at the safe location comprises:
    searching for a safe zone or a shoulder near the autonomous vehicle with support of a high definition (HD) map and rapidly preparing for a safe stop;
    upon determining that there is a safe zone near the autonomous vehicle, changing the destination to the safe zone, and when the autonomous vehicle arrives at the safe zone, bringing the autonomous vehicle to the safe stop;
    upon determining that there is no safe zone but there is a shoulder near the autonomous vehicle, changing the destination to the shoulder, and when the autonomous vehicle arrives at the shoulder, bringing the autonomous vehicle to the safe stop; and
    upon determining that there is neither safe zone nor shoulder near the autonomous vehicle, slowly bringing the autonomous vehicle to the safe stop in a lane with emergency lights on.

\* \* \* \* \*